(12) United States Patent
Kawakami

(10) Patent No.: US 10,450,035 B2
(45) Date of Patent: Oct. 22, 2019

(54) BICYCLE OPERATING DEVICE

(71) Applicant: Shimano Inc., Sakai, Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 551 days.

(21) Appl. No.: 15/263,802

(22) Filed: Sep. 13, 2016

(65) Prior Publication Data

US 2018/0072382 A1     Mar. 15, 2018

(51) Int. Cl.
*B62M 25/04*     (2006.01)
*B62K 23/06*     (2006.01)
*B62M 25/00*     (2006.01)

(52) U.S. Cl.
CPC ............ *B62M 25/04* (2013.01); *B62K 23/06* (2013.01); *B62M 2025/003* (2013.01)

(58) Field of Classification Search
CPC .. B62M 2025/003; B62M 25/04; B62K 23/06
USPC ...................................... 74/473.13
See application file for complete search history.

(56) References Cited

U.S. PATENT DOCUMENTS 7,152,497 B2 * 12/2006 Sato ................. B62K 23/06
                                                             74/502.2
8,881,619 B2 * 11/2014 Lim .................. G05G 1/04
                                                             74/502.2

* cited by examiner

*Primary Examiner* — Zakaria Elahmadi
*Assistant Examiner* — Randell J Krug
(74) *Attorney, Agent, or Firm* — Global IP Counselors, LLP

(57) ABSTRACT

A bicycle operating device includes a support structure, a release member, a positioning ratchet and a position maintaining pawl. The release member is movable between first and second positions. The positioning ratchet has positioning ratchet teeth that establish predetermined positions. The position maintaining pawl is movable between a ratchet maintaining position and a ratchet releasing position. The position maintaining pawl includes a positioning portion, a holding portion, a release portion and a contact portion. The positioning portion moves away from the positioning ratchet, while the contact portion and the holding portion move toward the positioning ratchet teeth as the release member contacts and moves the release portion away from the release member as the release member moves in a releasing direction. The release portion moves away from the release member in response to movement of the positioning ratchet contacting and moving the contact portion away from the positioning ratchet.

18 Claims, 12 Drawing Sheets

BICYCLE OPERATING DEVICE

BACKGROUND

Field of the Invention

This invention generally relates to a bicycle operating device. More specifically, the present invention relates to a bicycle operating device for operating a bicycle component between a plurality of predetermined positions.

Background Information

Bicycles are often provided with one or more bicycle components that can be operated and/or adjusted by a rider while riding. Examples of some these bicycle components include a gear changing device (e.g., a derailleur or an internally geared hub), a suspension and a seatpost. A bicycle operating device is usually provided on a bicycle (e.g., on a bicycle handlebar) for a rider to operate and/or adjust these bicycle components. The bicycle operating device is often connected to the bicycle component with, for example, a Bowden-type control cable. Some bicycle components are moved between a plurality of positions. For example, a gearshift operating device (bicycle shifter) is one example of a bicycle operating device that is provided with a positioning unit for establishing speed stages for a gear changing device. One example of a bicycle operating device (bicycle shifter) is disclosed in U.S. Pat. No. 7,152,497, which is assigned to Shimano Inc. In this U.S. patent, the bicycle operating device is provided with a positioning unit (i.e., a position maintaining mechanism) that includes a plurality of position maintaining teeth, a release wheel with a plurality of release teeth, and a position maintaining pawl including a position maintaining portion, a position release portion and a movement limiting portion. The positioning unit or position maintaining mechanism is configured to establish a plurality of speed stages for a gear changing device.

SUMMARY

Generally, the present disclosure is directed to various features of a bicycle operating device. In the case of the above mentioned U.S. patent, in certain instances, the position maintaining pawl may not easily clear a tip of a release tooth of the release wheel. As a result, the releasing action may not be as smooth as desired.

One aspect is to provide a bicycle operating device having an improved releasing action.

In view of the state of the known technology and in accordance with a first aspect of the present disclosure, a bicycle operating device is basically provided that comprises a support structure, a release member, a positioning ratchet and a position maintaining pawl. The release member is movably supported with respect to the support structure between a first position and a second position. The positioning ratchet is movably supported with respect to the support structure between a plurality of predetermined positions. The positioning ratchet includes a plurality of positioning ratchet teeth. The position maintaining pawl is movably supported with respect to the support structure between a ratchet maintaining position and a ratchet releasing position. The position maintaining pawl includes a positioning portion, a holding portion, a release portion and a contact portion. The positioning portion is arranged to move away from the positioning ratchet, while the contact portion and the holding portion are configured to move toward the positioning ratchet teeth in response to movement of the release member contacting and moving the release portion away from the release member as the release member moves in a releasing direction between the first and second positions. The release portion is further arranged to move away from the release member in response to movement of the positioning ratchet contacting and moving the contact portion.

According to the first aspect of the present invention, the bicycle operating device is configured such that a potential shock occurring between the release member and the release portion of the position maintaining pawl during a release operation is effectively reduced.

In accordance with a second aspect of the present invention, the bicycle operating device according to the first aspect is configured so that the position maintaining pawl includes a first pawl part and a second pawl part that moves with the first pawl part during at least portion of the movement of the release member in the releasing direction. Also the first pawl part includes the positioning portion and the holding portion. Also the second pawl part includes the release portion and the contact portion.

According to the second aspect of the present invention, the bicycle operating device is configured such that the position maintaining pawl is relatively easy to manufacture.

In accordance with a third aspect of the present invention, the bicycle operating device according to the second aspect is configured so that the first pawl part is a separate member from the second pawl part.

According to the third aspect of the present invention, the bicycle operating device is configured such that a wide range of possible material can be used for the position maintaining pawl.

In accordance with a fourth aspect of the present invention, the bicycle operating device according to the second or third aspect is configured so that the contact portion of the second pawl part contacts the positioning ratchet prior to the holding portion of the first pawl part contacting the positioning ratchet upon the release member moving the release portion of the second pawl part in response to the movement of the release member in the releasing direction.

According to the fourth aspect of the present invention, the bicycle operating device is configured such that a potential shock occurring between the release member and the release portion of the position maintaining pawl during a release operation is effectively reduced.

In accordance with a fifth aspect of the present invention, the bicycle operating device according to any one of the first to fourth aspects is configured so that the first pawl part and the second pawl part are configured to rotate together around a first pivot axis.

According to the fifth aspect of the present invention, the bicycle operating device is configured such that a smooth release operation can be reliably achieved.

In accordance with a sixth aspect of the present invention, the bicycle operating device according to the fifth aspect is configured so that the second pawl part is configured to rotate independently from the first pawl part around a second pivot axis that is offset from the first pivot axis.

According to the sixth aspect of the present invention, the bicycle operating device is configured such that a potential shock occurring between the release member and the release portion of the position maintaining pawl during a release operation is effectively reduced.

In accordance with a seventh aspect of the present invention, the bicycle operating device according to the sixth aspect is configured so that the first pawl part and the second pawl part rotates together around the first pivot axis upon the release member moving the release portion of the second pawl part in response to the movement of the release member in the releasing direction.

According to the seventh aspect of the present invention, the bicycle operating device is configured such that a smooth release operation can be reliably achieved.

In accordance with an eighth aspect of the present invention, the bicycle operating device according to the seventh aspect is configured so that the second pawl part rotates independently from the first pawl part around the second pivot axis upon the positioning ratchet moving the contact portion of the second pawl part in response to the movement of the release member in the releasing direction.

According to the eighth aspect of the present invention, the bicycle operating device is configured such that a potential shock occurring between the release member and the release portion of the position maintaining pawl during a release operation is effectively reduced.

In accordance with a ninth aspect of the present invention, the bicycle operating device according to any one of the second to eighth aspects is configured so that the positioning ratchet is configured to rotate around a center rotational axis. Also the positioning ratchet is axially offset from the release member in an axial direction parallel to the center rotational axis.

According to the ninth aspect of the present invention, the bicycle operating device is configured such that a smooth release operation can be reliably achieved.

In accordance with a tenth aspect of the present invention, the bicycle operating device according to the ninth aspect is configured so that the first pawl part is axially offset from the release member in the axial direction.

According to the tenth aspect of the present invention, the bicycle operating device is configured such that a smooth release operation can be reliably achieved.

In accordance with an eleventh aspect of the present invention, the bicycle operating device according to any one of the first to eighth aspects is configured so that the release member is configured to rotate around a center rotational axis, and the positioning ratchet is configured to rotate around the center rotational axis.

According to the eleventh aspect of the present invention, the bicycle operating device is configured such that the bicycle operating device can be made to be relatively compact.

In accordance with a twelfth aspect of the present invention, the bicycle operating device according to any one of the second to eleventh aspects is configured so that the release member is configured to rotate around a center rotational axis, and the positioning ratchet is configured to rotate around the center rotational axis.

According to the twelfth aspect of the present invention, the bicycle operating device is configured such that the bicycle operating device can be made to be relatively compact.

In accordance with a thirteenth aspect of the present invention, the bicycle operating device according to the twelfth aspect is configured so that the first pawl part is configured to rotate around a first pivot axis. Also the second pawl part is mounted on the first pawl part to rotate relative to the first pawl part around a second pivot axis that is offset from the first pivot axis.

According to the thirteenth aspect of the present invention, the bicycle operating device is configured such that a potential shock occurring between the release member and the release portion of the position maintaining pawl during a release operation is effectively reduced.

In accordance with a fourteenth aspect of the present invention, the bicycle operating device according to the thirteenth aspect is configured so that the first pawl part and the second pawl part rotate together around the first pivot axis in a direction away from the positioning ratchet and the release member, respectively, upon the release member moving the release portion of the second pawl part in response to the movement of the release member in the releasing direction.

According to the fourteenth aspect of the present invention, the bicycle operating device is configured such that a smooth release operation can be reliably achieved.

In accordance with a fifteenth aspect of the present invention, the bicycle operating device according to the first aspect is configured so that the second pawl part rotates independently from the first pawl part around the second pivot axis upon the positioning ratchet contacting and moving the contact portion of the second pawl part away from the positioning ratchet in response to the movement of the release member in the releasing direction.

According to the fifteenth aspect of the present invention, the bicycle operating device is configured such that a potential shock occurring between the release member and the release portion of the position maintaining pawl during a release operation is effectively reduced.

In accordance with a sixteenth aspect of the present invention, the bicycle operating device according to any one of the thirteenth to fifteenth aspects is configured so that the holding portion is closer to the first pivot axis than the contact portion.

According to the sixteenth aspect of the present invention, the bicycle operating device is configured such that a smooth release operation can be reliably achieved.

In accordance with a seventeenth aspect of the present invention, the bicycle operating device according to any one of the thirteenth to sixteenth aspects is configured so that the release portion is closer to the first pivot axis than the positioning portion.

According to the seventeenth aspect of the present invention, the bicycle operating device is configured such that a smooth release operation can be reliably achieved.

In accordance with an eighteenth aspect of the present invention, the bicycle operating device according to any one of the thirteenth to seventeenth aspects is configured so that the holding portion is closer to the second pivot axis than the contact portion. Also the release portion is closer to the second pivot axis than the holding portion. Also the positioning portion is closer to the second pivot axis than the release portion.

According to the eighteenth aspect of the present invention, the bicycle operating device is configured such that a smooth release operation can be reliably achieved.

Also other objects, features, aspects and advantages of the disclosed bicycle operating device will become apparent to those skilled in the art from the following detailed description, which, taken in conjunction with the annexed drawings, discloses one embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
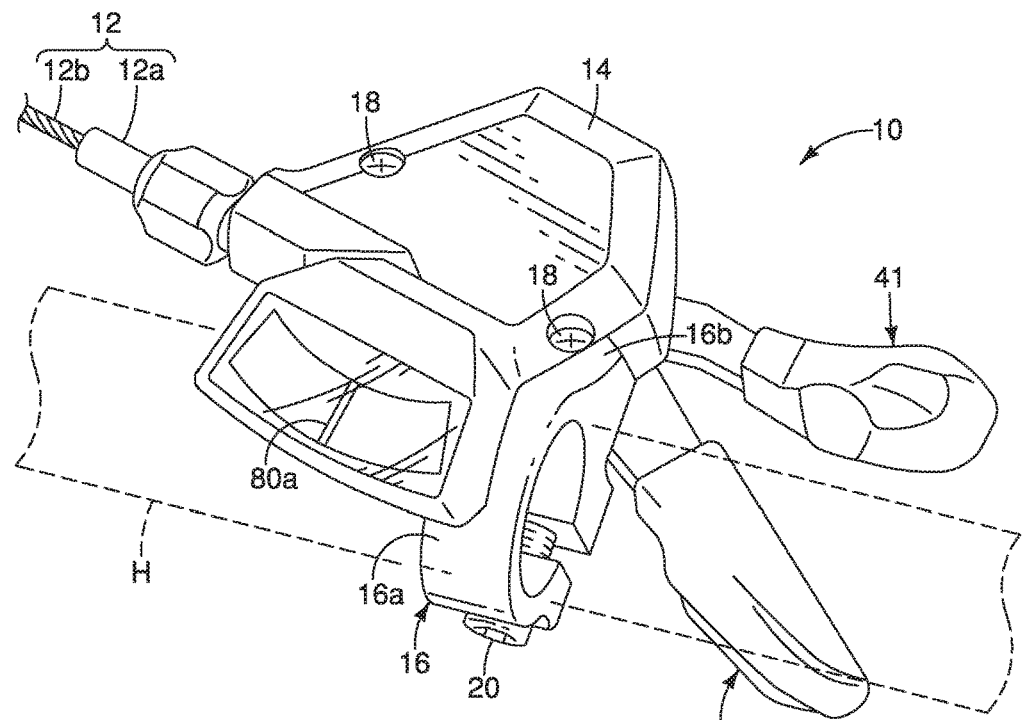
FIG. 1 is a top perspective view of a right end of a bicycle handlebar that is equipped with a bicycle operating device in accordance with one illustrated embodiment.

Referring initially to FIG. 1, a bicycle operating device 10 is illustrated in accordance with one illustrated embodiment. Here, the bicycle operating device 10 is configured to be mounted to a right side of a handlebar H so as to be operated by rider's right hand. In the first illustrated embodiment, the bicycle operating device 10 is configured to be operatively coupled to a bicycle component (not shown) via a control cable 12. In the illustrated embodiment, the bicycle operating device 10 is configured as a shifter for controlling a gear position of a rear gear changing device such as a derailleur or an internally geared hub. However, the bicycle operating device 10 can be configured as a bicycle control device for operating other types of bicycle components (e.g., suspension devices) as needed and/or desired.

Also, the bicycle operating device 10 can be modified to be mounted on the left side of a handlebar H. Thus, two bicycle operating devices could be provided on opposite ends of the handlebar H. In such a case, the one of the bicycle operating devices would be used to operate a first bicycle component and the other of the bicycle operating devices would be used to operate a second bicycle component. When the bicycle operating devices are configured as gear shifters, the two bicycle operating devices could be essentially identical in operation, except that they would be mirror images of each other, and they may have a different number of actuation (shift) positions.

Preferably, as seen in FIG. 1, the control cable 12 is a conventional bicycle operating cable that has an outer case 12a covering an inner wire 12b. In other words, the control cable 12 is a Bowden type cable in which the inner wire 12b is slidably received within the outer case 12a. The bicycle operating device 10 operates the bicycle component (not shown) by selectively pulling and releasing the inner wire 12b.

As seen in FIG. 1, the bicycle operating device 10 comprises a housing 14 and a handlebar clamp 16. Here, the housing 14 and the handlebar clamp 16 are separate members that are attached together. However, the handlebar clamp 16 can be integrally form with a part of the housing 14 as a one-piece member as needed and/or desired. Also, the handlebar clamp 16 can be adjustably mounted to the housing 14 as needed and/or desired.

The housing 14 (FIG. 1) covers the internal components of the bicycle operating device 10 that release from the inner wire 12b to feed out of the housing 14 and that pull the inner wire 12b into the housing 14. Here, for example, the housing 14 has a two-piece construction (i.e., upper and lower housing parts) that is fastened together by a plurality of screws 18. The housing parts are hard rigid members constructed of a suitable material such as a hard plastic or a lightweight metal. However, the housing 14 can have a variety of configurations as needed and/or desired.

The handlebar clamp 16 is constructed of a hard rigid material such as a hard plastic or a lightweight metal. The handlebar clamp 16 includes a clamp portion 16a and an attachment portion 16b. As seen in FIG. 1, the attachment portion 16b of the handlebar clamp 16 is partially concealed by the housing 14. The clamp portion 16a is a conventional tube clamp that constitutes an example of a handlebar mounting member. Here, the clamp portion 16a is provided with a tightening bolt 20 (i.e., a tightening member) that is configured to squeeze the handlebar clamp 16 onto the handlebar H.

Figure 2:
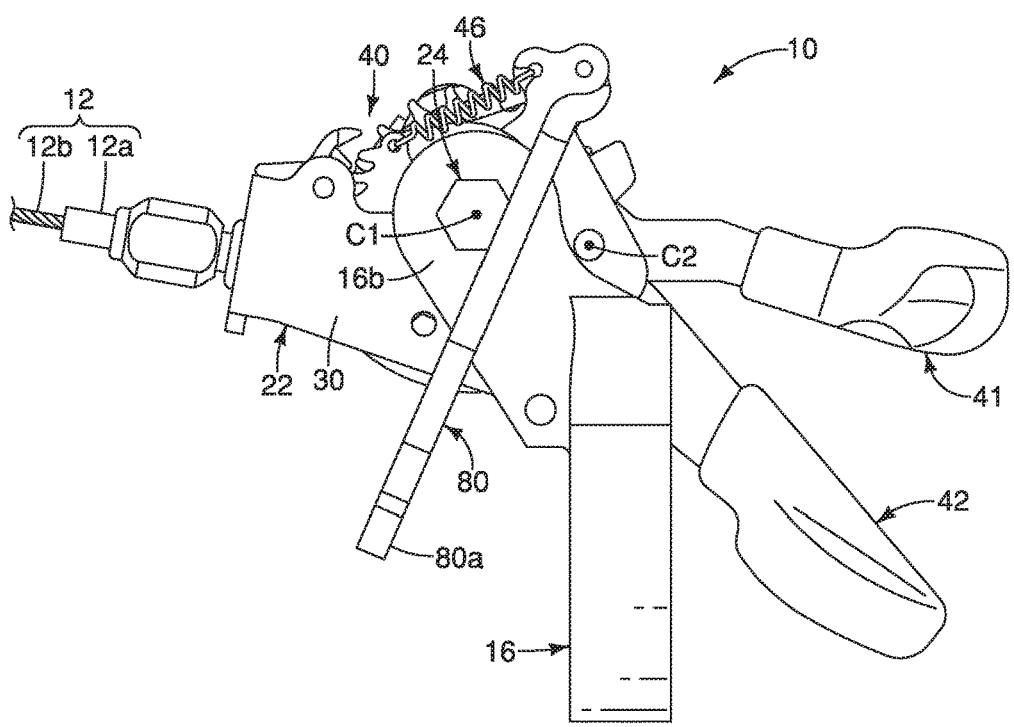
FIG. 2 is a top plan view of the bicycle operating device illustrated in FIG. 1, but with the housing removed to reveal internal parts of the bicycle operating device.
Figure 3:
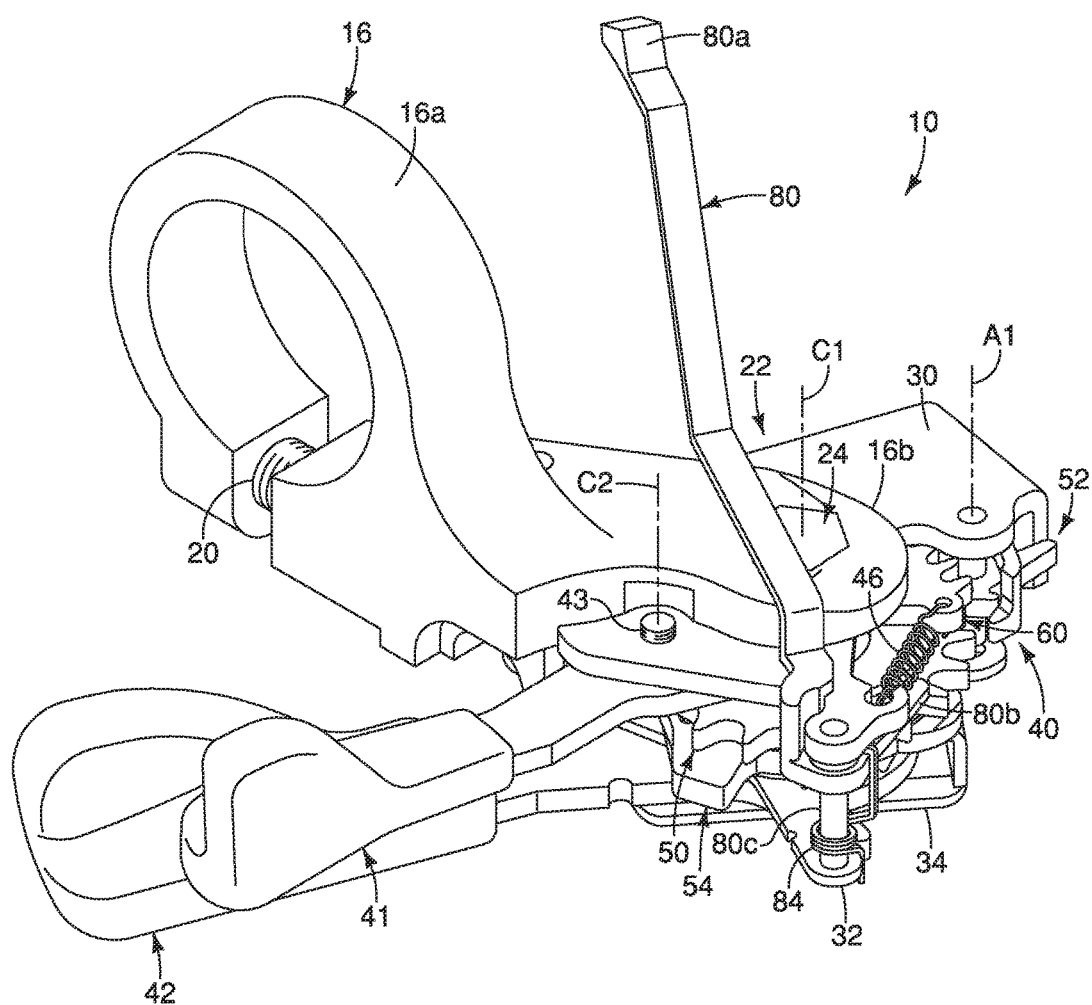
FIG. 3 is a perspective view of the internal parts of the bicycle operating device illustrated in FIG. 2.
Figure 4:
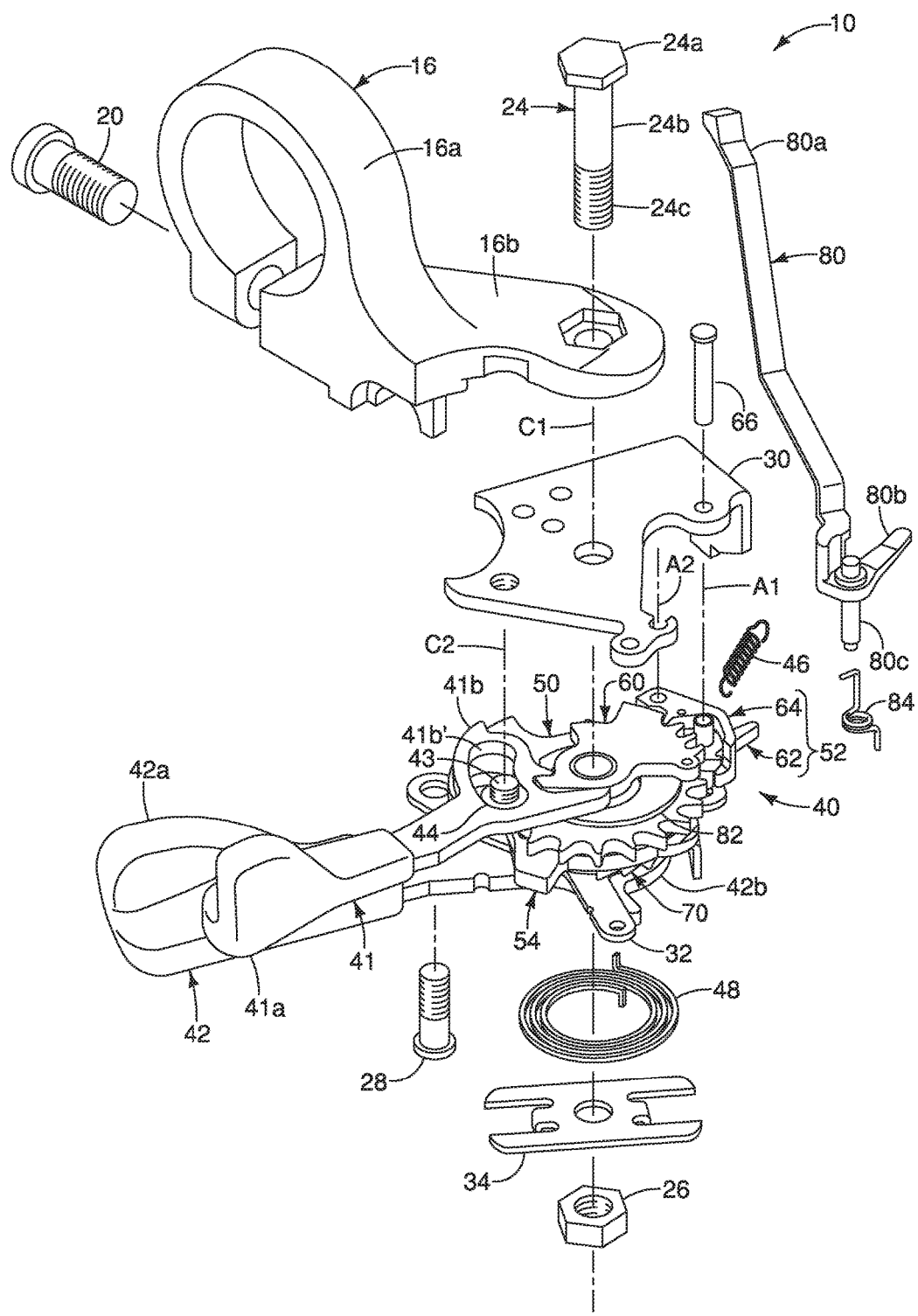
FIG. 4 is an exploded perspective view of the selected internal parts of the bicycle operating device illustrated in FIG. 1.

As seen in FIGS. 2 to 4, the bicycle operating device 10 comprises a support structure 22. The handlebar clamp 16 is primarily mounted to the support structure 22 by a mounting bolt 24 and a fixing nut 26. Here, as seen in FIG. 4, an additional fixing bolt 28 is used to secure the handlebar clamp 16 to the support structure 22. In particular, the mounting bolt 24 has a head 24a and a shaft 24b with an external thread 24c. The shaft 24b extends through an opening 16c of the attachment portion 16b of the handlebar clamp 16 and through the support structure 22. The fixing nut 26 is screwed onto the external thread 24c of the free end of the shaft 24b. The fixing bolt 28 extends upwardly through the support structure 22 and is screwed into the bottom side of the handlebar clamp 16.

As seen in FIGS. 2 to 4, the support structure 22 basically comprises a first or upper support 30, a second or intermediate support 32 and a third or lower support 34. The first, second and third supports 30, 32 and 34 are rigid plate members that are bent to form an internal frame or base member of the bicycle operating device 10. For example, the first, second and third supports 30, 32 and 34 are constructed from metal plates. Basically, the first, second and third supports 30, 32 and 34 are fixed together by the mounting bolt 24 and the fixing nut 26.

As seen in FIGS. 3 to 7, the bicycle operating device 10 further comprises a position maintaining mechanism 40. The bicycle operating device 10 further comprises a first operating member 41 and a second operating member 42. Here, the first and second operating members 41 and 42 re user operating levers that are each movably arranged between a rest position and an actuated position. Thus, the first operating member 41 constitutes a wire release lever. The first operating member 41 is used by the user for performing a releasing operation of the inner wire 12b in which the inner wire 12b can be payed out of the housing 14. On the other hand, the second operating member 42 is used by the user for performing a pulling operation of the inner wire 12 in which the inner wire 12b can be pulled into the housing 14. Thus, the second operating member 42 constitutes a wire pull lever.

The first operating member 41 basically has a user operated portion 41a and a mounting portion 41b. Similarly, the second operating member 42 has a user operated portion 42a and a mounting portion 41b. The mounting portion 41b of the first operating member 41 also has a first projection 41c and a second projection 41d, which will be discussed later. The user operated portions 41a and 42a are the portions of the first and second operating members 41 and 42 that are disposed outside of the housing 14 and position for the user to operate from the handlebar H while the bicycle operating device 10 is mounted on the handlebar H. The mounting portions 41b and 42b are the portions of the first and second operating members 41 and 42 that are disposed inside the housing 14 and mounted to the support structure 22.

In the illustrated embodiment, the first operating member 41 is movably mounted to the support structure 22 by a fixing bolt 43. In particular, the fixing bolt 43 is screwed into the first support 30 for movably supporting the first operating member 41 on the support structure 22. The second operating member 42 is pivotally mounted to the support structure 22 by the mounting bolt 24 and the fixing nut 26. The mounting bolt 24 defines a center rotational axis C1, while the fixing bolt 43 defines a pivot axis C2. The center rotational axis C1 also constitutes a first operating axis of both the first and second operating members 42, while the pivot axis C2 constitutes a second operating axis of the first operating member 41.

Figure 5:
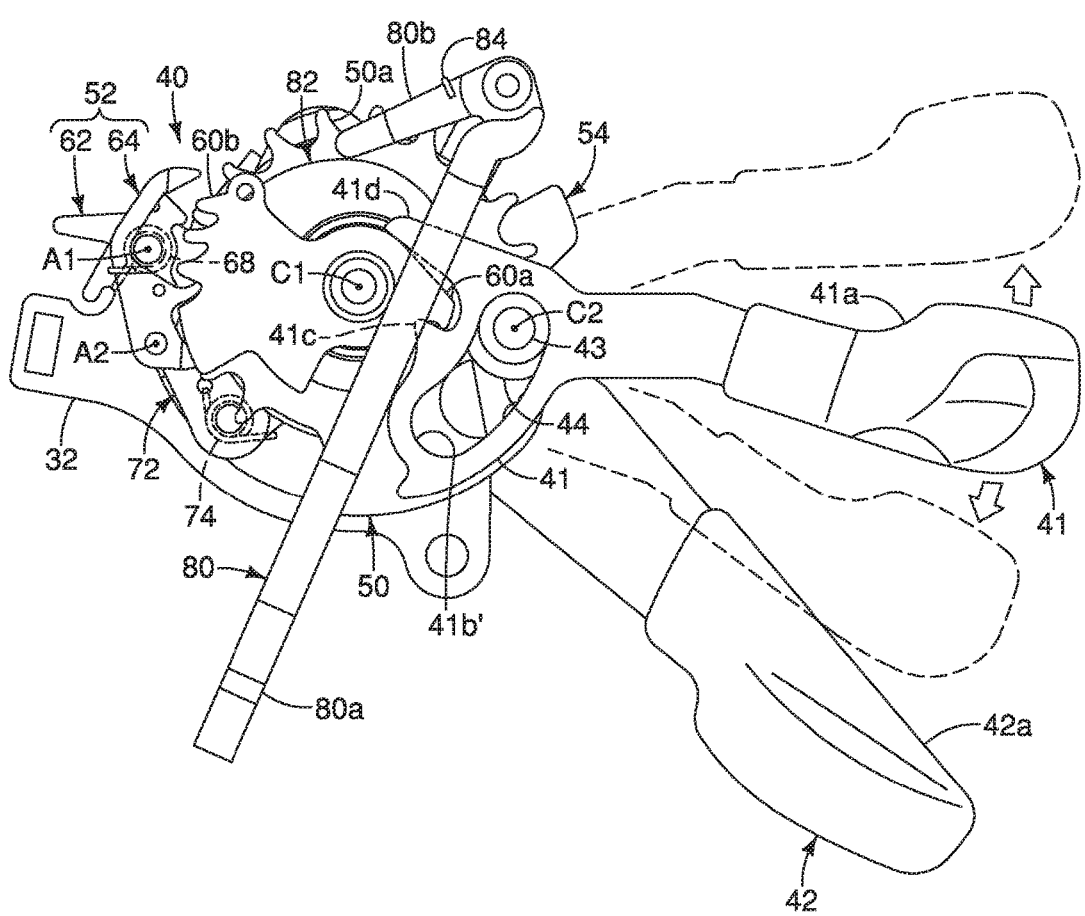
FIG. 5 is a top plan view of selected internal parts of the bicycle operating device illustrated in FIG. 1.

As seen in FIG. 5, in the illustrated embodiment, the first operating member 41 can be operated in either direction with respect to the support structure 22 from the rest position to perform a releasing operation. When the first operating member 41 is moved in a direction towards from the handlebar H, the second operating member 42 pivots about the center rotational axis C1. In particular, the first operating member 41 has an arcuate slot 41b' that receives the fixing bolt 43 and a bushing 44 that is disposed on the fixing bolt 43. Preferably, the arcuate slot 41b' is arranged such that the arcuate slot 41b' curves along an arc having its center located at the center rotational axis C1. In this way, the arcuate slot 41b' permits the first operating member 41 to pivot about the center rotational axis C1. However, when the first operating member 41 is moved in a direction away from the handlebar H, the second operating member 42 abuts against the bushing 44, and thus, pivots about the pivot axis C2. Of course, alternatively, the first operating member 41 can be configured such that the first operating member 41 can be pivoted in only one direction to perform a releasing operation.

Preferably, the first and second operating members 41 and 42 are each biased towards their respective rest position such that the first and second operating members 41 and 42 are trigger levers. The term "rest position" as used herein refers to a state in which the part (e.g., the first and second operating members 41 and 42) remains stationary without the need of a user holding the part in that state corresponding to the rest position. In the illustrated embodiment, as seen in FIG. 4, a first biasing element 46 is provided for biasing the first operating member 41 towards the rest position, while a second biasing element 48 is provided for biasing the second operating member 42 towards the rest position.

The position maintaining mechanism 40 of the bicycle operating device 10 basically comprises a positioning ratchet 50 and a position maintaining pawl 52. The positioning ratchet 50 is movably supported with respect to the support structure 22 between a plurality of predetermined positions. In this way, the position maintaining mechanism 40 can establish a predetermined shift positions when the bicycle operating device 10 is used for operating a gear changing device (e.g., a derailleur or an internally geared hub) such as in the illustrated embodiment. In the illustrated embodiment, the position maintaining mechanism 40 further comprises a wire take-up member 54 to which one end of the inner wire 12b is operatively attached. The wire take-up member 54 has a peripheral groove 54b formed in its peripheral edge for receiving the inner wire 12b. The wire take-up member 54 is rotatably supported on the support structure 22 by the mounting bolt 24 to rotate about the center rotational axis C1. The wire take-up member 54 is non-rotatably coupled to the positioning ratchet 50. In this way, the positioning ratchet 50 and the wire take-up member 54 are movably (i.e., rotatably) arranged in accordance with the operations of the first and second operating members 41 and 42. Here, a wire attachment member 56 is provided for operatively attaching one end of the inner wire 12b to the wire take-up member 54.

A biasing element 58 (see FIGS. 6 and 7) is provided for biasing the positioning ratchet 50 and the wire take-up member 54 towards in a first direction D1 about the center rotational axis C1. The first direction D1 corresponds to a wire releasing direction in which the inner wire 12b is payed out of the housing 14. In the illustrated embodiment, the biasing element 58 is a flat torsion spring that is coiled around the mounting bolt 24. A first free end of the biasing element 58 operatively coupled to the first positioning ratchet 50 and the wire take-up member 54, while a second free end of the biasing element 58 contacts the second support 32 of the support structure 22. In this way, when the position maintaining pawl 52 is disengaged from the positioning ratchet 50 during a releasing operation, the positioning ratchet 50 and the wire take-up member 54 rotate in the first direction D1 about the center rotational axis C1. In some instances, the biasing element 58 can be omitted and the positioning ratchet 50 and the wire take-up member 54 can be rotated in the first direction D1 about the center rotational axis C1 by a biasing element of the bicycle component being operated via the inner wire 12b that interconnects the bicycle operating device 10 and the bicycle component being operated.

In order to perform a releasing operation, the bicycle operating device 10 further comprises a release member 60. The release member 60 is movably supported with respect to the support structure 22 between a first position and a second position. Here, the first position of the release member 60 corresponds to a rest position, while the second position of the release member 60 corresponds to an actuated position. In the illustrated embodiment, the release member 60 is pivotally mounted to the support structure 22 by the mounting bolt 24. Thus, the release member 60 is configured to rotate around the center rotational axis C1. The release member 60 pivots in a second direction D2 about the center rotational axis C1 when the release member 60 moves from the first (rest) position and the second (actuated) position. As discussed below, the second direction D2 corresponds to a wire pulling direction in which the inner wire 12b is pulled into of the housing 14. Thus, the first and second directions D1 and D2 are opposite rotational directions with respect to the center rotational axis C1.

Basically, the release member 60 is pivoted in response to movement of the first operating member 41 from the rest positon to one of the two actuated positions. Thus, when the release member 60 is pivoted by the first operating member 41, the position maintaining pawl 52 moves temporarily out of engagement with the positioning ratchet 50. As a result of the disengagement of the position maintaining pawl 52 from the positioning ratchet 50, the positioning ratchet 50 and the wire take-up member 54 are free to rotate one of the predetermined positions in the first direction D1 about the center rotational axis C1. In the illustrated embodiment, the positioning ratchet 50 and the wire take-up member 54 are moved in the first direction D1 by the biasing force of the biasing element 58.

In particular, the release member 60 includes an operating projection 60a and a plurality of caroming teeth or abutments 60b. The operating projection 60a engages the first and second projections 41c and 41d of the first operating member 41. In this way, the first operating member 41 is moved away from the handlebar H, the first operating member 41 and the release member 60 move together as a single unit about the center rotational axis C1. However, when the first operating member 41 is moved towards the handlebar H, the first operating member 41 moves relative the release member 60 by pivoting on the fixing bolt 43 about the pivot axis C2.

Here in the illustrated embodiment, the release member 60 is a separate part from the first operating member 41 so that the release member 60 is pivoted about the center rotational axis C1 in the second direction D2 when the first operating member 41 is operated in either direction with respect to the housing 14 from the rest position of FIG. 5. Of course, alternatively, the first operating member 41 can be configured such that the first operating member 41 can be pivoted in only one direction to perform a releasing operation. In other words, the release member 60 can be integrally formed with the first operating member 41 as a single piece if it is desirable for the first operating member 41 to be operated only in a single direction.

As mentioned above, the positioning ratchet 50 is movably supported with respect to the support structure 22 between a plurality of predetermined positions. In particular, the positioning ratchet 50 is configured to rotate around the center rotational axis C1. Also the positioning ratchet 50 is axially offset from the release member 60 in an axial direction parallel to the center rotational axis C1. In other words, the positioning ratchet 50 and the release member 60 do not lie in the same plane that is perpendicular to the center rotational axis C1. Rather, the positioning ratchet 50 and the release member 60 are stacked on the mounting bolt 24 with the positioning ratchet 50 and the release member 60 being rotatable with respect to each other.

Preferably, the positioning ratchet 50 includes a plurality of positioning ratchet teeth 50a. Also preferably, the positioning ratchet 50 includes an attachment portion 50b in the form of an opening for receiving a portion of the wire attachment member 56 thereto. The position maintaining pawl 52 selectively engages the positioning ratchet teeth 50a one at a time to selectively establish predetermined positions. In particular, the position maintaining pawl 52 is movably supported with respect to the support structure 22 between a ratchet maintaining position and a ratchet releasing position. Thus, when the release member 60 is pivoted by the first operating member 41, the position maintaining pawl 52 is moved by the camming teeth 60b of the release member 60 from the ratchet maintaining position and the ratchet releasing position. As a result, the position maintaining pawl 52 is temporarily moved out of engagement with the positioning ratchet teeth 50a of the positioning ratchet 50 to permit the positioning ratchet 50 and the wire take-up member 54 to rotate in the first direction D1. However, as explained below, the position maintaining pawl 52 subsequently engages another one of the positioning ratchet teeth 50a of the positioning ratchet 50 to limit further rotation of the positioning ratchet 50 and the wire take-up member 54 in the first direction D1.

As seen in FIGS. 11 to 18, in the illustrated embodiment, the position maintaining pawl 52 includes a first pawl part 62 and a second pawl part 64. The first pawl part 62 is a separate member from the second pawl part 64. However, the second pawl part 64 is pivotally mounted on the first pawl part 62. The first pawl part 62 is axially offset from the release member 60 in the axial direction. The first pawl part 62 is configured to rotate around a first pivot axis A1. Also the second pawl part 64 is mounted on the first pawl part 62 to rotate relative to the first pawl part 62 around a second pivot axis A2 that is offset from the first pivot axis A1.

With this arrangement, the first pawl part 62 and the second pawl part 64 are configured to rotate together around the first pivot axis A1. The first pivot axis A1 is defined by a pivot pin 66 that pivotally supports the first and second pawl parts 62 and 64 on the support structure 22. Moreover, with this arrangement, the second pawl part 64 is configured to rotate independently from the first pawl part 62 around the second pivot axis A2 that is offset from the first pivot axis A1. In particular, the first pawl part 62 includes a stepped shaped pivot pin 62a that is disposed in a mating stepped shaped bore 64a of the second pawl part 64. The pivot pin 62a defines the second pivot axis A2. Moreover, the first pawl part 62 includes a pair of tubular members 62b1 and 62b2 for receiving the pivot pin 66 that defines the first pivot axis A1. The first pawl part 62 further includes an abutment 62d, which will be discussed below with regards to a winding operation of the second operating member 42.

As a result of this two pawl part arrangement, during a releasing operation, initially, the second pawl part 64 moves with the first pawl part 62 during at least portion of the movement of the release member 60 in the releasing direction. In other words, the first and second pawl parts 62 and 64 pivot together around the first pivot axis A1 upon the release member 60 initially moving the second pawl part 64 in response to the movement of the release member 60 in the releasing direction. This pivotal movement the first and second pawl parts 62 and 64 around the first pivot axis A1 applies a force on the first pawl part 62 to provide clearance between the first pawl part 62 and the tooth of the positioning ratchet teeth 50a. In this way, the first pawl part 62 is temporarily disengaged from the positioning ratchet teeth 50a of the positioning ratchet 50 to permit the positioning ratchet 50 and the wire take-up member 54 to rotate in the first direction D1. However, the first pawl part 62 and the second pawl part 64 both pivots around the first pivot axis A1 to subsequently engage upstream teeth of the positioning ratchet teeth 50a of the positioning ratchet 50. The subsequent engagement of the first pawl part 62 further limits the rotation of the positioning ratchet 50 and the wire take-up member 54 in the first direction D1. As a result of the contact between the second pawl part 64 and one of the positioning ratchet teeth 50a of the positioning ratchet 50, the second pawl part 64 is pivoted relative to the first pawl part 62 around the second pivot axis A2. This pivotal movement the second pawl part 64 relative to the first pawl part 62 around the second pivot axis A2 also applies a force on the second pawl part 64 to provide clearance between the second pawl part 64 and the caroming teeth 60b of the release member 60. Once the tooth of positioning ratchet teeth 50a that was just disengaged moves pass the first pawl part 62, the first and second pawl parts 62 and 64 again pivot together around the first pivot axis A1 but in the opposite direction towards engagement with the positioning ratchet teeth 50a of the positioning ratchet 50.

Preferably, a biasing element 68 is provided between the second support 32 and the second pawl part 64 for biasing both the first and second pawl parts 62 and 64 (i.e., the position maintaining pawl 52) towards engagement with the positioning ratchet teeth 50a of the positioning ratchet 50. In other words, the position maintaining pawl 52 is biased towards the ratchet maintaining position by the biasing element 68. Here, the biasing element 68 is a flat spring that is coiled around the first pivot axis A1 with a first free end engaged with the second support 32 and a second fee end engaged with the second pawl part 64.

Basically, in the illustrated embodiment, the first and second pawl parts 62 and 64 cooperate together such that the position maintaining pawl 52 includes a positioning portion 52a, a holding portion 52b, a release portion 52c and a contact portion 52d. While the position maintaining pawl 52 is made up of the first and second pawl parts 62 and 64, in a more simplistic embodiment, the position maintaining pawl 52 could be a single piece that forms the positioning portion 52a, the holding portion 52b, the release portion 52c and the contact portion 52d. Here, the first pawl part 62 includes the positioning portion 52a and the holding portion 52b, while the second pawl part 64 includes the release portion 52c and the contact portion 52d. The second pawl part 64 further includes a positioning abutment 64b that is arranged to contact the positioning ratchet teeth 50a of the positioning ratchet 50 when the bicycle operating device 10 in the rest position. Thus, the positioning abutment 64b acts as an additional positioning abutment portion of the position maintaining pawl 52.

Basically, the first pawl part 62 pivots in a first direction about the first pivot axis A1 on the during a first segment of the releasing operation and then pivots back in a second direction that is opposite to the first direction on the first pivot axis A1 on the during a last segment of the releasing operation. In particular, the positioning portion 52a and the positioning abutment 64b both move away from the positioning ratchet teeth 50a and the holding portion 52b moves towards from the positioning ratchet teeth 50a as the first pawl part 62 pivots about the first pivot axis A1 during the first segment of the releasing operation. On the other hand, the positioning portion 52a and the positioning abutment 64b move towards from the positioning ratchet teeth 50a and the holding portion 52b moves away from the positioning ratchet teeth 50a as the first pawl part 62 pivots about the first pivot axis A1 during the last segment of the releasing operation.

In the illustrated embodiment, the release portion 52c is closer to the first pivot axis A1 than the positioning portion 52a. Also the release portion 52c is closer to the second pivot axis A2 than the holding portion 52b. Also the positioning portion 52a is closer to the second pivot axis A2 than the release portion 52c. In the illustrated embodiment, the holding portion 52b is closer to the first pivot axis A1 than the contact portion 52d. Also the holding portion 52b is closer to the second pivot axis A2 than the contact portion 52d.

Figure 19:
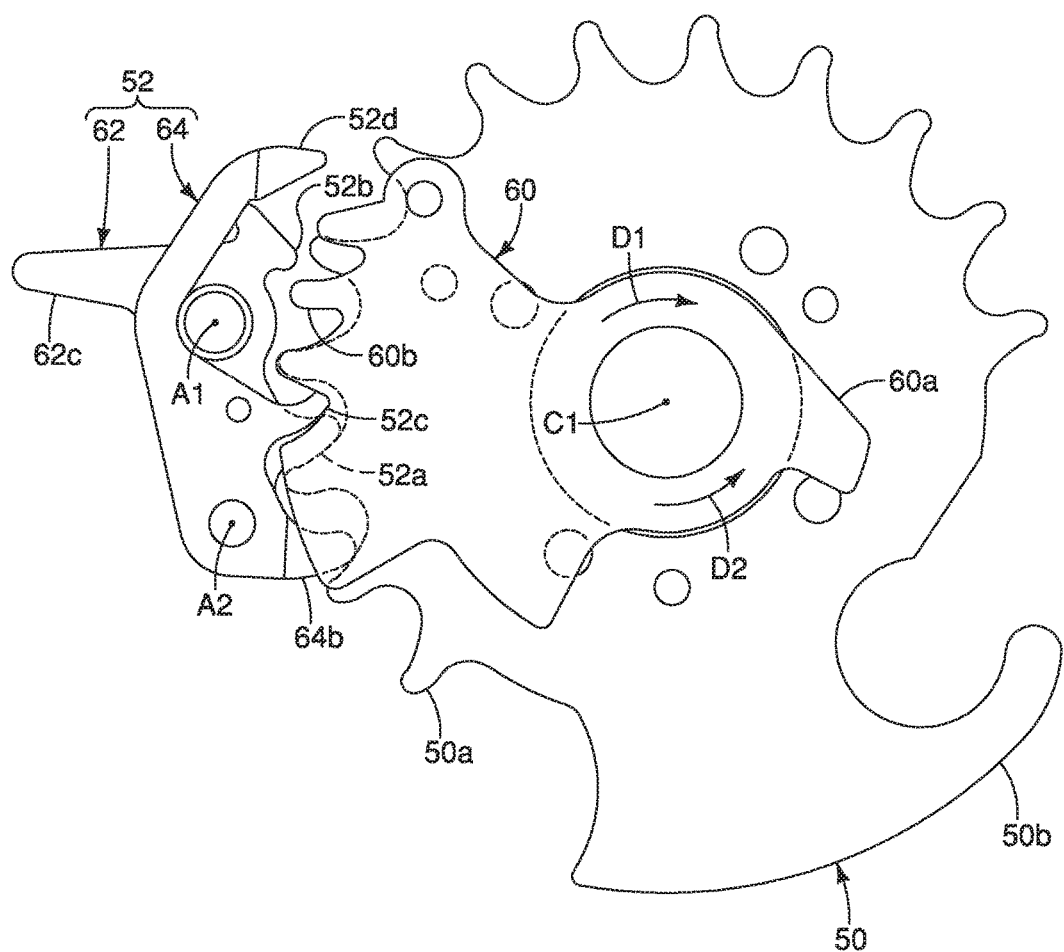
FIG. 19 is a top plan view of selected parts of the position maintaining mechanism of the bicycle operating device illustrated in FIG. 1.
Figure 20:
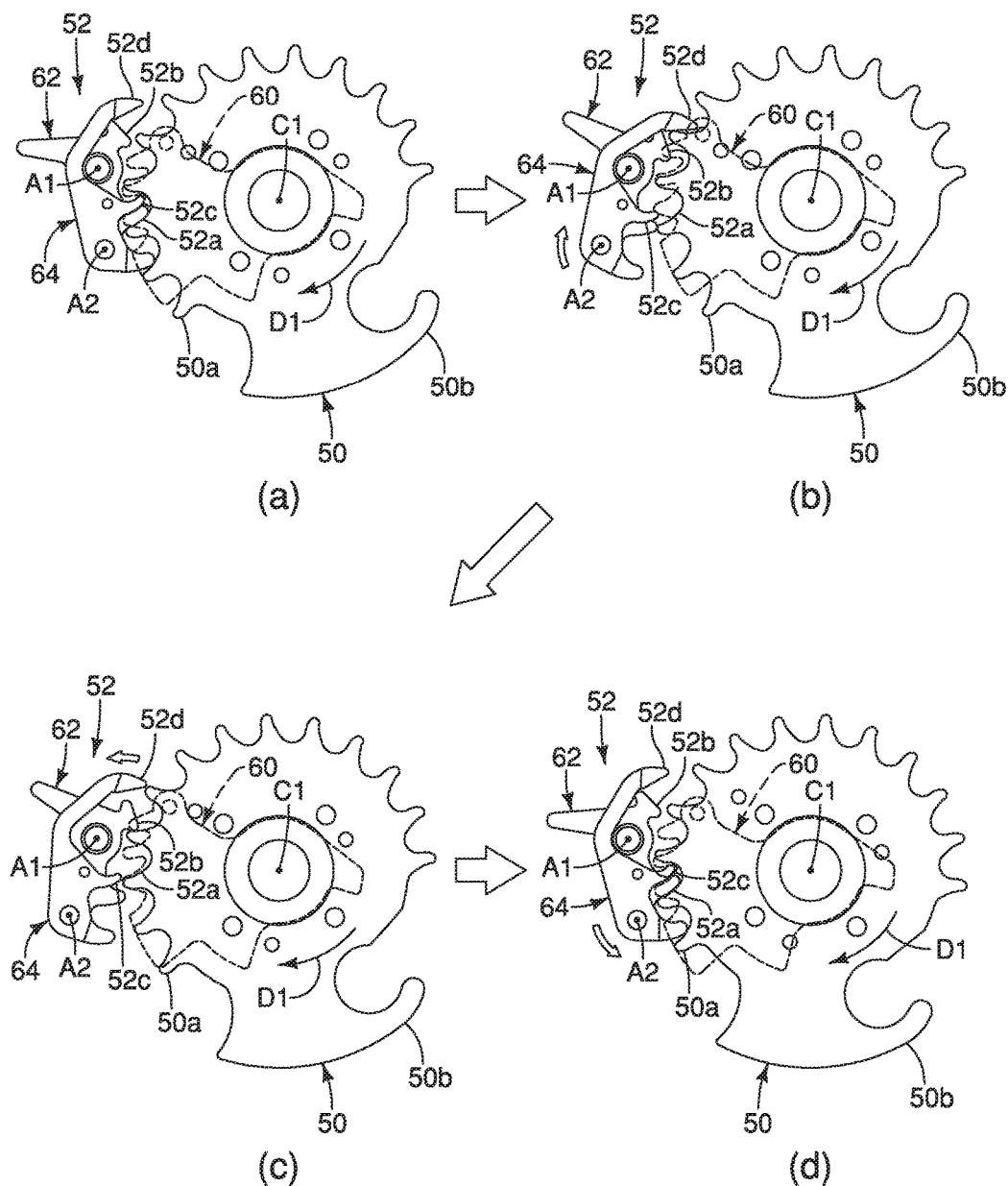
FIG. 20 is a series of top plan views of the selected parts the position maintaining mechanism illustrated in FIG. 19 illustrating a releasing operation.

Referring to FIGS. 19 and 20, the positioning ratchet 50 is biased to the first (clockwise or releasing) direction D1 about the center rotational axis C1 by the biasing element 58. The release member 60 is biased to the first (clockwise or releasing) direction D1 about the center rotational axis C1 by the biasing element 46. However, as mentioned above, the positioning ratchet 50 and the release member 60 are independently movable with respect to each other about the center rotational axis C1. The first and second pawl parts 62 and 64 are biased in a counterclockwise direction about a first pivot axis A1 by the biasing element 68 as seen in FIGS. 19 and 20. The first pawl part 62 is configured to selectively maintain the positioning ratchet 50 in one of the predetermined positions. FIG. 19 and view (a) of FIG. 20 show a rest position of the illustrated parts. Views (b) to (d) of FIG. 20 show a releasing operation in which the positioning ratchet 50 is moved from one of the predetermined positions to an immediately adjacent one of the predetermined positions.

In particular, View (b) of FIG. 20 shows the release member 60 being rotate in the second (counterclockwise) D2 direction about the center rotational axis C1 to rotate the first and second pawl parts 62 and 64 in the clockwise direction about the first pivot axis A1 against the biasing force of the biasing element 68. Specifically, one of the camming teeth 60b contacts the release portion 52c of the second pawl part 64 to rotate the pawl part 64 in the clockwise direction about the first pivot axis A1. In this way, the second pawl part 64 also rotates the first pawl part 62 in the clockwise direction about the first pivot axis A1 in response to the movement of the release member 60 pressing against the release portion 52c of the second pawl part 64. In other words, the first pawl part 62 and the second pawl part 64 rotates together around the first pivot axis A1 in a direction away from the positioning ratchet 50 and the release member 60, respectively, upon the release member 60 moving the release portion 52c of the second pawl part 64 in response to the movement of the release member 60 in the releasing direction.

As a result of this movement of the first pawl part 62, the positioning portion 52a of the first pawl part 62 is moved away from the positioning ratchet 50 and the holding portion 52b of the first pawl part 62 is moved toward the positioning ratchet 50. Also the contact portion 52d of the second pawl part 64 is moved toward the positioning ratchet 50 as the second pawl part 64 rotates in the clockwise direction about the first pivot axis A1. In other words, the positioning portion 52a is arranged to move away from the positioning ratchet 50, while the contact portion 52d and the holding portion 52b are configured to move toward the positioning ratchet teeth 50a in response to movement of the release member 60 contacting and moving the release portion 52c away from the release member 60 as the release member 60 moves in a releasing direction between the first and second positions.

Since the positioning portion 52a of the first pawl part 62 is moved away from the positioning ratchet 50, the positioning portion 52a disengages from one of the positioning ratchet teeth 50a. As a result, the positioning ratchet 50 rotates in the first (clockwise) direction D1 about the center rotational axis C1 in response to the positioning portion 52a disengaging from the positioning ratchet 50. However, as seen in view (b) of FIG. 20, the holding portion 52b of the first pawl part 62 and the contact portion 52d of the second pawl part 64 are moved into the path of the positioning ratchet teeth 50a as the second pawl part 64 rotates in the clockwise direction about the first pivot axis A1.

Now, as seen in view (c) of FIG. 20, the second pawl part 64 rotates in counterclockwise direction about the second pivot axis A2 in response to the rotational movement of the positioning ratchet 50 and one of the positioning ratchet teeth 50a pressing against the contact portion 52d. In other words, the second pawl part 64 rotates independently from the first pawl part 62 around the second pivot axis A2 upon the positioning ratchet 50 contacting and moving the contact portion 52d of the second pawl part 64 in response to the movement of the release member 60 in the releasing direction. As a result of one of the positioning ratchet teeth 50a pressing against the contact portion 52d, the release portion 52c of the second pawl part 64 is moved further away from the release member 60. In other words, the release portion 52c is further arranged to move away from the release member 60 in response to movement of the positioning ratchet 50 contacting and moving the contact portion 52d away from the positioning ratchet 50. Also the holding portion 52b of the first pawl part 62 is located in the path of the positioning ratchet teeth and stop rotation of the positioning ratchet 50 the first rotational direction D1 about the center rotational axis C1 in response to the holding portion 52b contacts with one of the positioning ratchet teeth 50a. However, the contact portion 52d of the second pawl part 64 contacts the positioning ratchet 50 prior to the holding portion 52b of the first pawl part 62 contacting the positioning ratchet 50 upon the release member 60 moving the release portion 52c of the second pawl part 64 in response to the movement of the release member 60 in the releasing direction.

As seen in views (c) and (d) of FIG. 20, as the release member 60 continues to rotate in the second rotational direction D2 about the center rotational axis C1 and the release portion 52c of the second pawl part 64 clears the tip of the release member 60 (view (c)), the first and second pawl parts 62 and 64 rotate in the counterclockwise direction about the first pivot axis A1 (view (d)). Now, as seen in view (d) of FIG. 20, the positioning portion 52a of the first pawl part 62 is engaged with the immediately adjacent one of the predetermined positions for establishing a new one of the predetermined positions.

Figure 21:
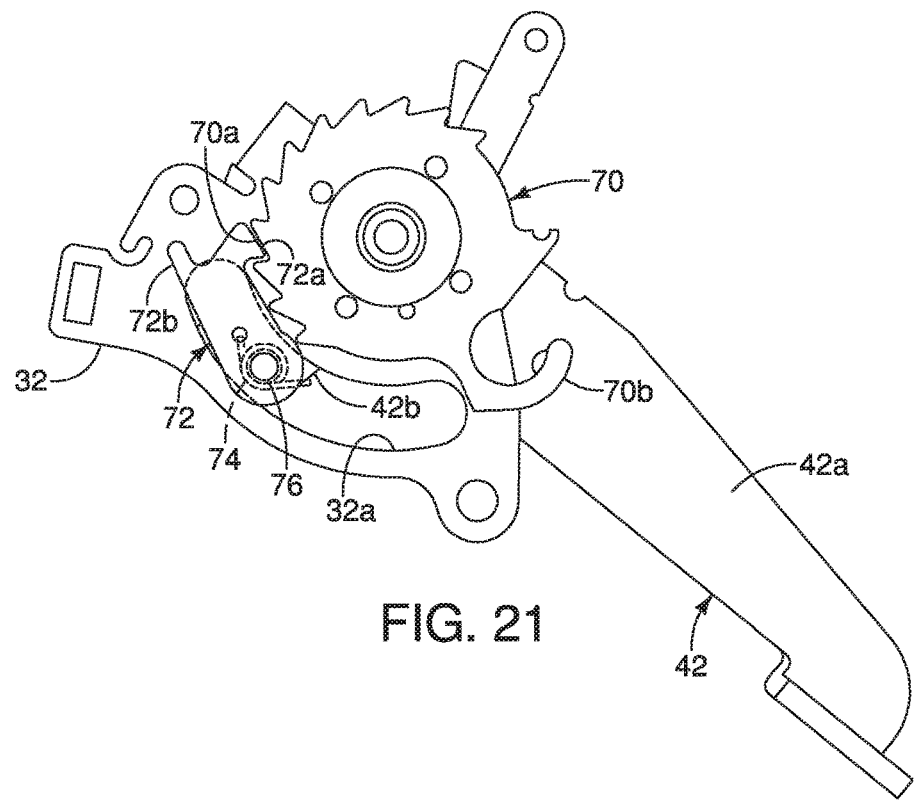
FIG. 21 is a top plan view of a portion of the support structure supporting the second operating member, the pulling pawl 72 and the pulling ratchet in their rest positions.
Figure 22:
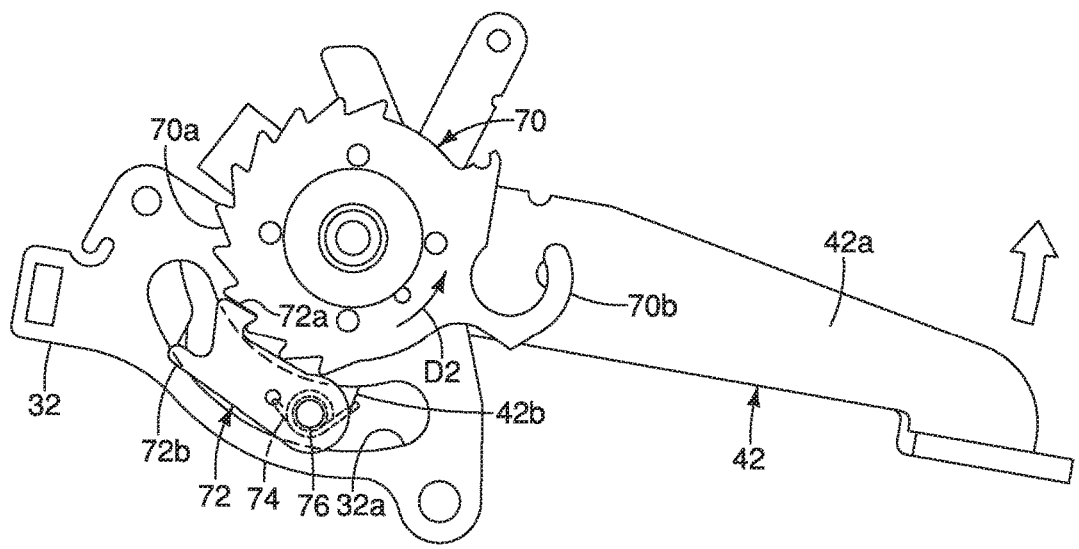
FIG. 22 is a top plan view of the second operating member, the pulling pawl 72 and the pulling ratchet illustrated in FIG. 21, but with the second operating member moved to an actuated position to rotate the pulling ratchet with the pulling pawl 72.

As seen in FIGS. 21 and 22, the bicycle operating device 10 further comprises a pulling ratchet 70 that is fixed to the wire take-up member 54. Thus, the pulling ratchet 70 moves with the wire take-up member 54 and the positioning ratchet 50 about the center rotational axis C1 as the positioning ratchet 50 and the wire take-up member 54 rotate together about the center rotational axis C1. The pulling ratchet 70 has a plurality of ratchet teeth 70a. Also preferably, the pulling ratchet 70 includes an attachment portion 70b in the form of an opening for receiving a portion of the wire attachment member 56 thereto.

Figure 6:
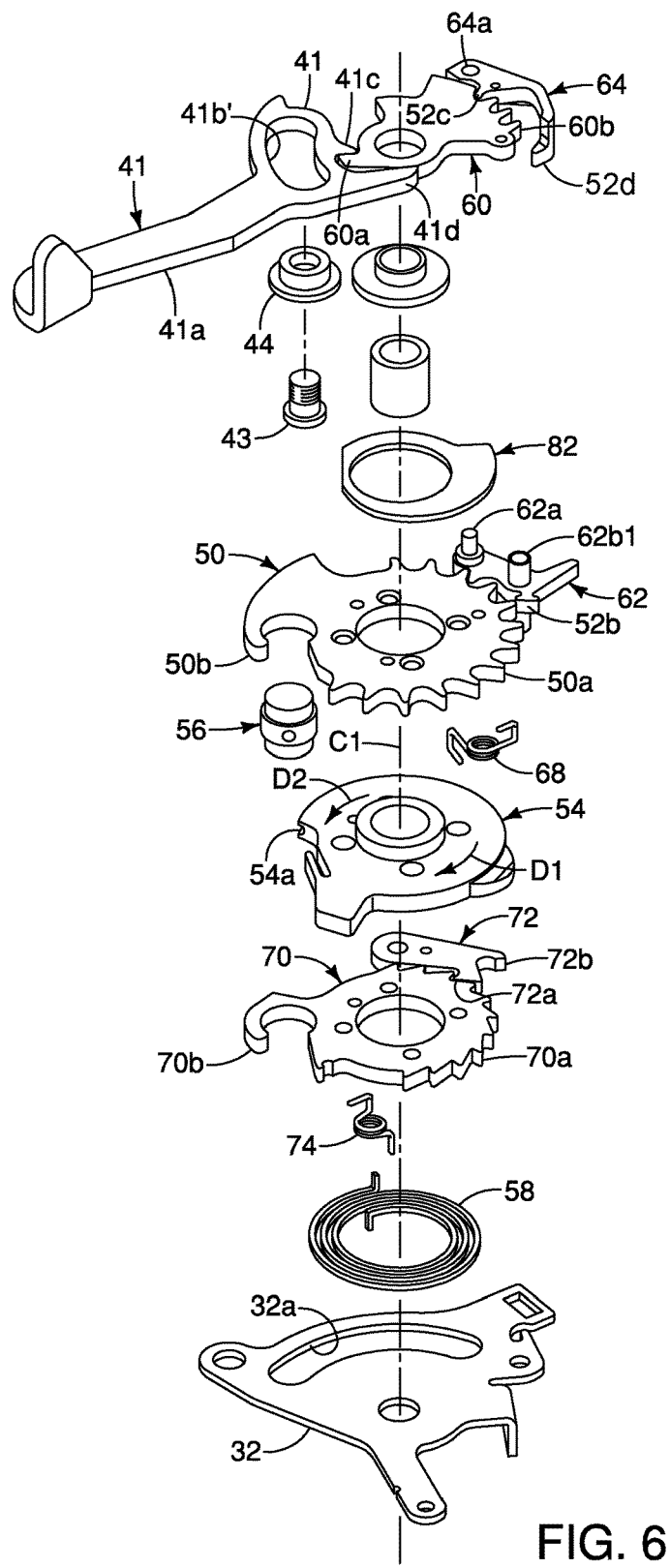
FIG. 6 is another exploded perspective view of the selected internal parts including a position maintaining mechanism of the bicycle operating device illustrated in FIG. 5.
Figure 7:
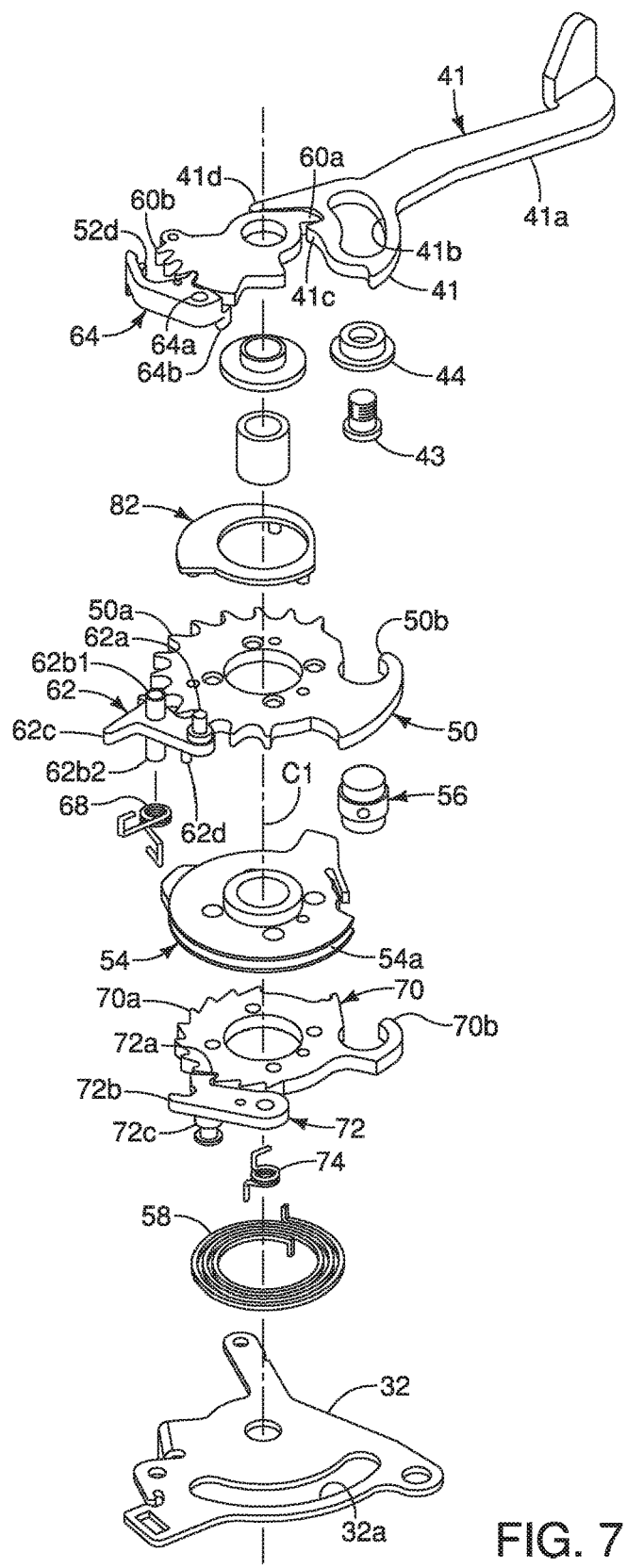
FIG. 7 is another exploded perspective view of the selected internal parts including the position maintaining mechanism illustrated in FIG. 6.
Figure 8:
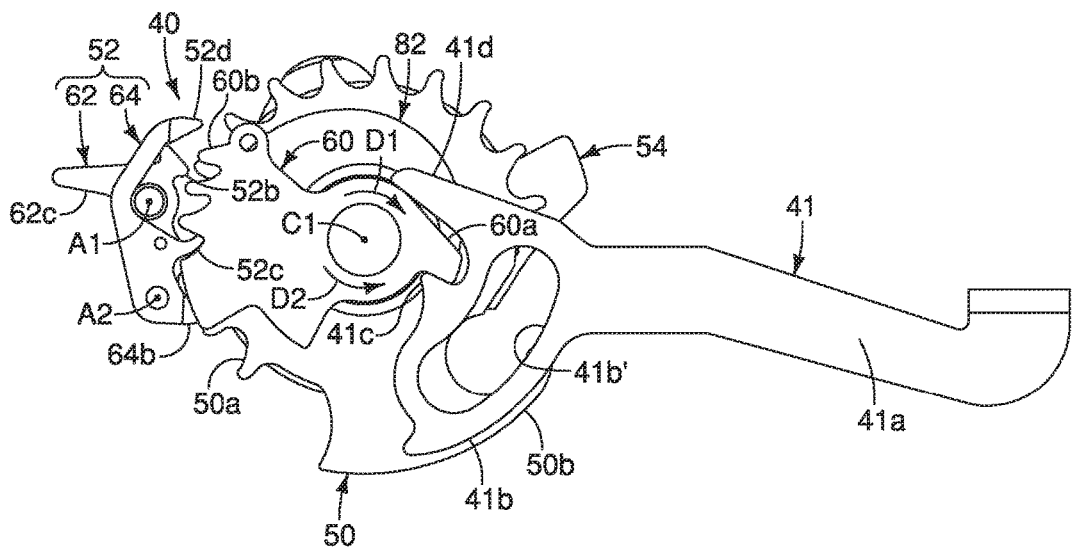
FIG. 8 is a top plan view of selected internal parts used for performing a wire releasing operation of the bicycle operating device illustrated in FIG. 1.
Figure 9:
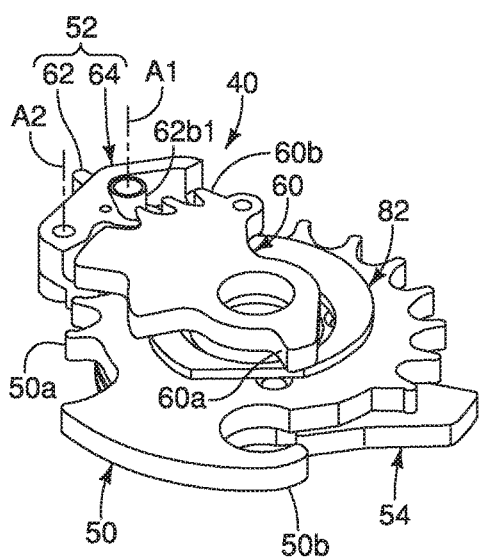
FIG. 9 is a perspective view of selected internal parts for performing a wire releasing operation of the bicycle operating device illustrated in FIG. 1.
Figure 10:
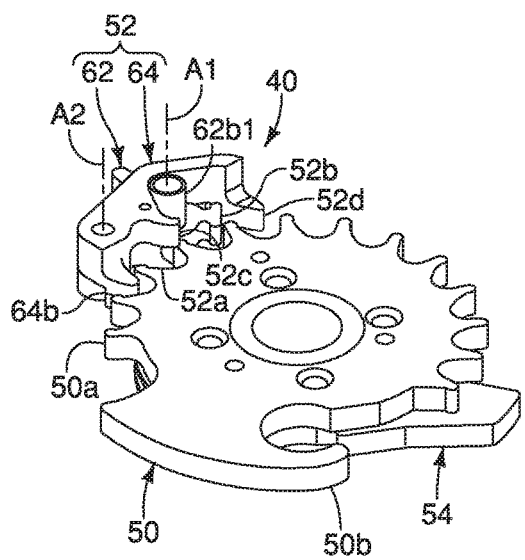
FIG. 10 is a perspective view, similar to FIG. 10, of the selected internal parts illustrated in FIG. 10, but with the release member removed.
Figure 11:
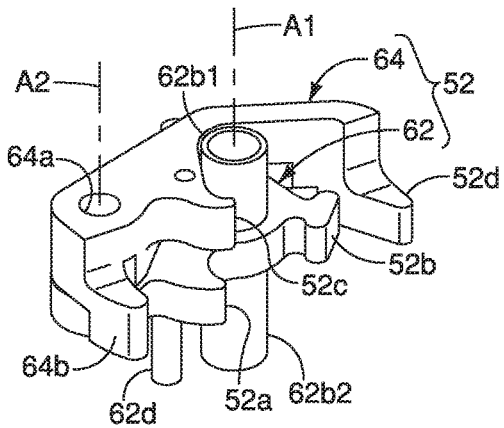
FIG. 11 is a perspective view of the position maintaining pawl of the position maintaining mechanism for the bicycle operating device illustrated in FIG. 1.
Figure 12:
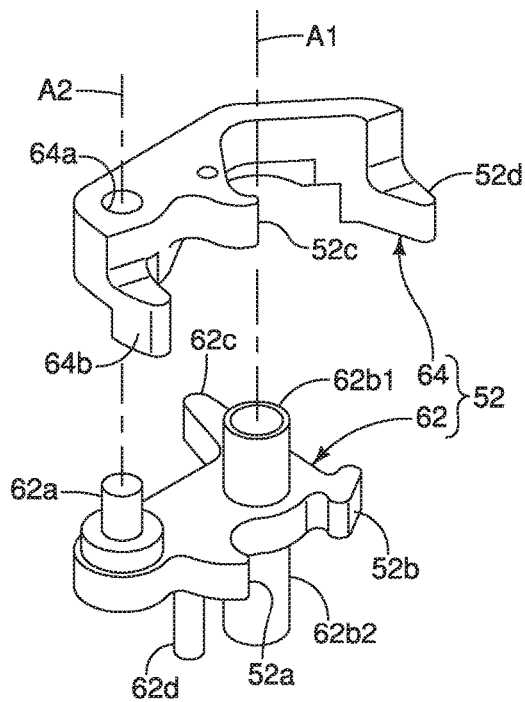
FIG. 12 is an exploded perspective view of the position maintaining pawl illustrated in FIG. 11.
Figure 13:
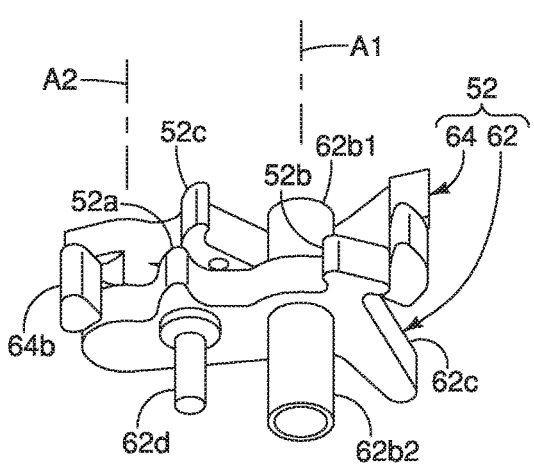
FIG. 13 is a perspective view of the position maintaining pawl of the position maintaining mechanism for the bicycle operating device illustrated in FIG. 1.
Figure 14:
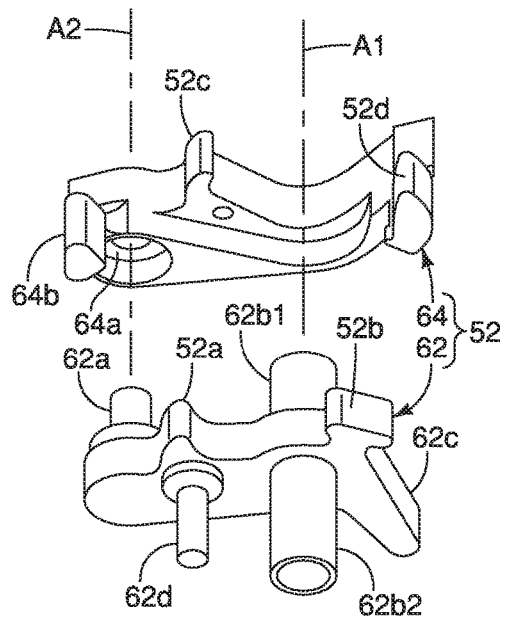
FIG. 14 is an exploded perspective view of the position maintaining pawl illustrated in FIG. 13.
Figure 15:
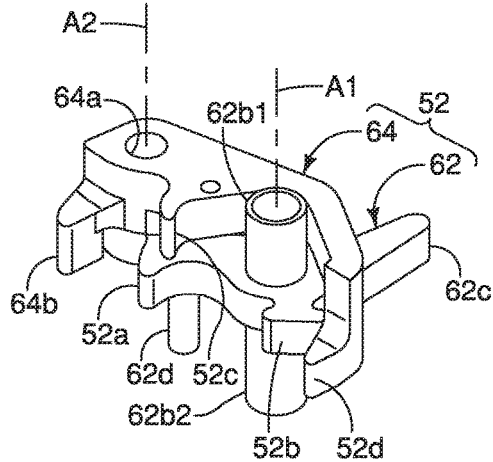
FIG. 15 is a perspective view of the position maintaining pawl of the position maintaining mechanism for the bicycle operating device illustrated in FIG. 1.
Figure 16:
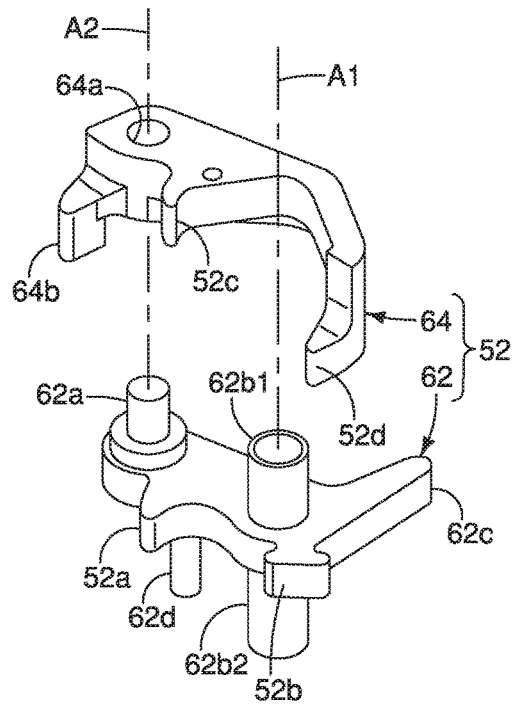
FIG. 16 is an exploded perspective view of the position maintaining pawl illustrated in FIG. 15.
Figure 17:
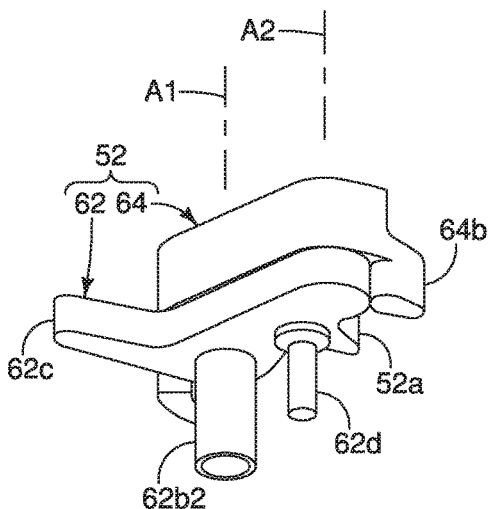
FIG. 17 is a perspective view of the position maintaining pawl of the position maintaining mechanism for the bicycle operating device illustrated in FIG. 1.
Figure 18:
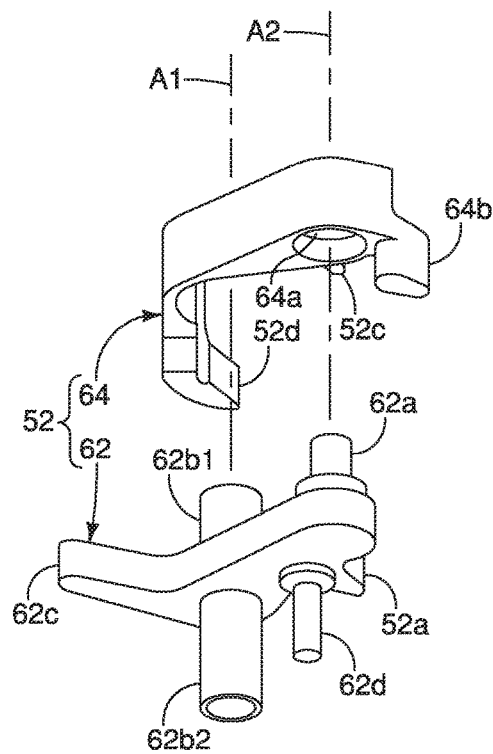
FIG. 18 is an exploded perspective view of the position maintaining pawl illustrated in FIG. 17.

The second operating member 42 is provided with a pulling pawl 72 for rotating the pulling ratchet 70 about the center rotational axis C1 in the second direction D2 as the second operating member 42 is operated from the rest position (FIG. 21) to the actuated position (FIG. 22). The pulling pawl 72 is biased towards the pulling ratchet 70 by a biasing element 74 (e.g., a torsion spring as seen in FIGS. 6 and 7). In particular, the pulling pawl 72 is pivotally mounted on the mounting portion 42b of the second operating member 42 by a pivot pin 76. The pivot pin 76 extends upwardly from the mounting portion 42b of the second operating member 42 and extends through the arcuate slot 32a in the second support 32. In this way, the second operating member 42 is located on the lower side of the second support 32, while the pulling pawl 72 is located on the upper side of the second support 32. Preferably, the biasing element 74 has a coiled portion disposed on the pivot pin 76. The biasing element 74 has a first free end contacting the edge of the mounting portion 42b of the second operating member 42 and a second free end disposed in a hole of the pulling pawl 72. In this way, the pulling pawl 72 is biased towards the pulling ratchet 70 by the biasing element 74 so that the pulling pawl 72 can rotate the pulling ratchet 70 in the second direction D2 as the second operating member 42 is operated from the rest position (FIG. 21) to the actuated position (FIG. 22). In particular, the pulling pawl 72 has a pulling tooth 72a that is located in the path of the ratchet teeth 70a while the second operating member 42 is in the rest position. Thus, the pulling pawl 72 is provided with an abutment 72b for moving the pulling tooth 72a out of the path of the ratchet teeth 70a during a releasing operation of the first operating member 41. More specifically, during a releasing operation of the first operating member 41, the first pawl part 62 pivots to the ratchet releasing position, which causes the abutment 62d of the first pawl part 62 to contact the abutment 72b of the pulling pawl 72 and rotate such that the pulling pawl 72 away from the ratchet teeth 70a.

Accordingly, when the second operating member 42 is pivoted about the center rotational axis C1 in the second direction D2, the wire take-up member 54 is also rotated in the second direction D2. A pulling mechanism is formed by the second operating member 42, the pulling ratchet 70 and the pulling pawl 72. The pulling mechanism is relatively conventional, and thus, the pulling mechanism will not be discussed in detail herein.

Referring back to FIGS. 1 to 5, optionally, the bicycle operating device 10 further comprises a position indicator 80 for indicating a current one of the predetermined positions established by the position maintaining mechanism 40. Here, the position indicator 80 is pivotally mounted between the first and second supports 30 and 32. The bicycle operating device 10 further comprises a cam plate 82 that is fixed to the positioning ratchet 50. The cam plate 82 rotates with the positioning ratchet 50 about the center rotational axis C1 as the positioning ratchet 50 and the wire take-up member 54 rotate together about the center rotational axis C1. A biasing element 84 is provided to biasing the position indicator 80 into contact with an edge of the cam plate 82. In particular, the position indicator 80 has an indicating arm 80a, a control arm 80b and a pivot pin 80c as seen in FIG. 4. The indicating arm 80a and the control arm 80b are attached to the pivot pin 80c. The pivot pin 80c is pivotally disposed between the first and second supports 30 and 32. The indicating arm 80a extends from the pivot pin 80c so that a tip of the free end of the indicating arm 80a is visible in a window of the housing 14 as seen in FIG. 1. The control arm 80b contacts the edge of the cam plate 82 so that the position indicator 80 pivots as the cam plate 82 rotates about the center rotational axis C1. This pivotal movement of the position indicator 80 cause the indicating arm 80a to move in the window of the housing 14 to indicate a current position of the position maintaining mechanism 40.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
    a support structure;
    a release member movably supported with respect to the support structure between a first position and a second position;
    a positioning ratchet movably supported with respect to the support structure between a plurality of predetermined positions, the positioning ratchet including a plurality of positioning ratchet teeth; and
    a position maintaining pawl movably supported with respect to the support structure between a ratchet maintaining position and a ratchet releasing position, the position maintaining pawl including a positioning portion, a holding portion, a release portion and a contact portion;
    the positioning portion being arranged to move away from the positioning ratchet while the contact portion and the holding portion are configured to move toward the positioning ratchet teeth in response to movement of the release member contacting and moving the release portion away from the release member as the release member moves in a releasing direction between the first and second positions, and
    the release portion being further arranged to move away from the release member in response to movement of the positioning ratchet contacting and moving the contact portion.

2. The bicycle operating device according to claim 1, wherein
    the position maintaining pawl includes a first pawl part and a second pawl part that moves with the first pawl part during at least a portion of the movement of the release member in the releasing direction, the first pawl part includes the positioning portion and the holding portion, the second pawl part includes the release portion and the contact portion.

3. The bicycle operating device according to claim 2, wherein
the first pawl part is a separate member from the second pawl part.

4. The bicycle operating device according to claim 2, wherein
the contact portion of the second pawl part contacts the positioning ratchet prior to the holding portion of the first pawl part contacting the positioning ratchet upon the release member moving the release portion of the second pawl part in response to the movement of the release member in the releasing direction.

5. The bicycle operating device according to claim 2, wherein
the first pawl part and the second pawl part are configured to rotate together around a first pivot axis.

6. The bicycle operating device according to claim 5, wherein
the second pawl part is configured to rotate independently from the first pawl part around a second pivot axis that is offset from the first pivot axis.

7. The bicycle operating device according to claim 6, wherein
the first pawl part and the second pawl part rotate together around the first pivot axis upon the release member moving the release portion of the second pawl part in response to the movement of the release member in the releasing direction.

8. The bicycle operating device according to claim 7, wherein
the second pawl part rotates independently from the first pawl part around the second pivot axis upon the positioning ratchet moving the contact portion of the second pawl part in response to the movement of the release member in the releasing direction.

9. The bicycle operating device according to claim 2, wherein
the positioning ratchet is configured to rotate around a center rotational axis, and
the positioning ratchet is axially offset from the release member in an axial direction parallel to the center rotational axis.

10. The bicycle operating device according to claim 9, wherein
the first pawl part is axially offset from the release member in the axial direction.

11. The bicycle operating device according to claim 1, wherein
the release member is configured to rotate around a center rotational axis, and
the positioning ratchet is configured to rotate around the center rotational axis.

12. The bicycle operating device according to claim 2, wherein
the release member is configured to rotate around a center rotational axis, and
the positioning ratchet is configured to rotate around the center rotational axis.

13. The bicycle operating device according to claim 12, wherein
the first pawl part is configured to rotate around a first pivot axis; and
the second pawl part is mounted on the first pawl part to rotate relative to the first pawl part around a second pivot axis that is offset from the first pivot axis.

14. The bicycle operating device according to claim 13, wherein
the first pawl part and the second pawl part rotate together around the first pivot axis in a direction away from the positioning ratchet and the release member, respectively, upon the release member moving the release portion of the second pawl part in response to the movement of the release member in the releasing direction.

15. The bicycle operating device according to claim 14, wherein
the second pawl part rotates independently from the first pawl part around the second pivot axis upon the positioning ratchet contacting and moving the contact portion of the second pawl part away from the positioning ratchet in response to the movement of the release member in the releasing direction.

16. The bicycle operating device according to claim 13, wherein
the holding portion is closer to the first pivot axis than the contact portion.

17. The bicycle operating device according to claim 13, wherein
the release portion is closer to the first pivot axis than the positioning portion.

18. The bicycle operating device according to claim 13, wherein
the holding portion is closer to the second pivot axis than the contact portion;
the release portion is closer to the second pivot axis than the holding portion; and
the positioning portion is closer to the second pivot axis than the release portion.

* * * * *